(12) United States Patent
Sharma et al.

(10) Patent No.: US 7,941,688 B2
(45) Date of Patent: May 10, 2011

(54) MANAGING TIMERS IN A MULTIPROCESSOR ENVIRONMENT

(75) Inventors: Parag Sharma, Issaquah, WA (US); Thomas Fahrig, Redwood, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 12/099,789

(22) Filed: Apr. 9, 2008

(65) Prior Publication Data

US 2009/0259870 A1    Oct. 15, 2009

(51) Int. Cl.
*G06F 1/04* (2006.01)
*G06F 1/14* (2006.01)

(52) U.S. Cl. .................................................. 713/502

(58) Field of Classification Search .............. 713/400, 713/500, 375, 502, 55; 718/100
See application file for complete search history.

(56) References Cited

U.S. PATENT DOCUMENTS

| | | | |
|---|---|---|---|
| 5,636,373 A | | 6/1997 | Glendening et al. |
| 5,838,957 A | * | 11/1998 | Rajaraman et al. ........... 713/502 |
| 6,826,761 B1 | * | 11/2004 | Damon et al. ................. 719/328 |
| 7,058,838 B2 | | 6/2006 | Xu |
| 7,085,948 B2 | | 8/2006 | Anderson et al. |
| 7,178,005 B1 | | 2/2007 | Jordan et al. |
| 2005/0050543 A1 | * | 3/2005 | Ogus et al. ..................... 718/100 |
| 2005/0097384 A1 | | 5/2005 | Uehara et al. |
| 2005/0273674 A1 | * | 12/2005 | Shinn et al. ..................... 714/55 |
| 2006/0020842 A1 | * | 1/2006 | Olsen et al. ................... 713/502 |
| 2006/0031588 A1 | * | 2/2006 | Sen et al. ...................... 709/248 |
| 2006/0085794 A1 | | 4/2006 | Yokoyama |
| 2006/0242442 A1 | | 10/2006 | Armstrong et al. |
| 2007/0033589 A1 | | 2/2007 | Nicholas et al. |
| 2007/0050764 A1 | | 3/2007 | Traut |
| 2008/0126820 A1 | * | 5/2008 | Fraser et al. .................. 713/375 |

FOREIGN PATENT DOCUMENTS

WO    2008011030 A2    1/2008

OTHER PUBLICATIONS

Barham et al, "Xen 2002", University of Cambridge, Computer Laboratory, Technical Report, No. 553, Jan. 2003, pp. 1-15.
Ferstay, "Fast Secure Virtualization for the ARM Platform", The University of British Columbia, Faculty of Graduate Studies, Mar. 2006, pp. 1-105.
Bjerke, "HPC Virtualization with Xen on Itanium", Master's thesis, Norwegian University of Science and Technology (NTNU), Trondheim, Norway, Jul. 2005, pp. 1-84.
Apostolopoulos, et al, "V-eM: A Cluster of Virtual Machines for Robust, Detailed, and High-Performance Network Emulation", Proc. of 14th IEEE International Symposium on Modeling, Analysis, and Simulation of Computer and Telecommunication Systems, 2006. MASCOTS 2006, Sep. 11-14, 2006, pp. 117-126.
"Hypervisor Functional Specification", Dated: Mar. 28, 2007—Preview Draft Version 0.83, http://www.microsoft.com/downloads/details.aspx?FamilyId=91E2E518-C62C-4FF2-8E50-3A37EA4100F5&displaylang=en.

\* cited by examiner

*Primary Examiner* — Thomas Lee
*Assistant Examiner* — Xuxing Chen
(74) *Attorney, Agent, or Firm* — Ogilvie Law Firm

(57) ABSTRACT

Timers are managed in a multiprocessing environment. Some timers are local to a given logical processor; such a local timer is inserted on and will be canceled only from that logical processor. Other timers are global to a logical processor. A global timer which was inserted on a given logical processor may be canceled from that logical processor or from another logical processor. Global timers are serviced in response to expiration of an associated local timer.

20 Claims, 4 Drawing Sheets

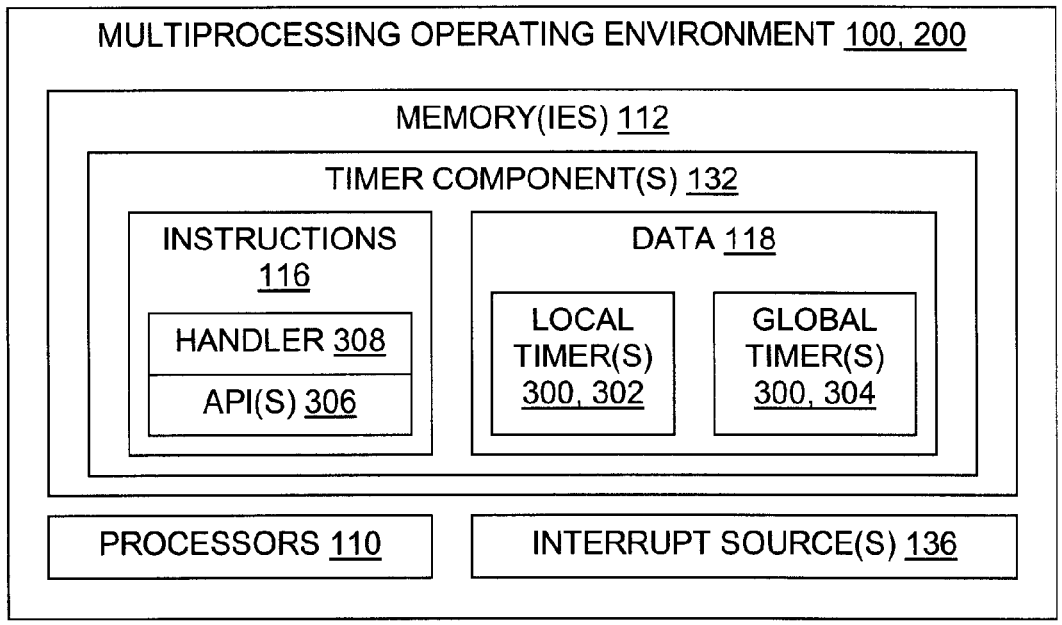
Fig. 3
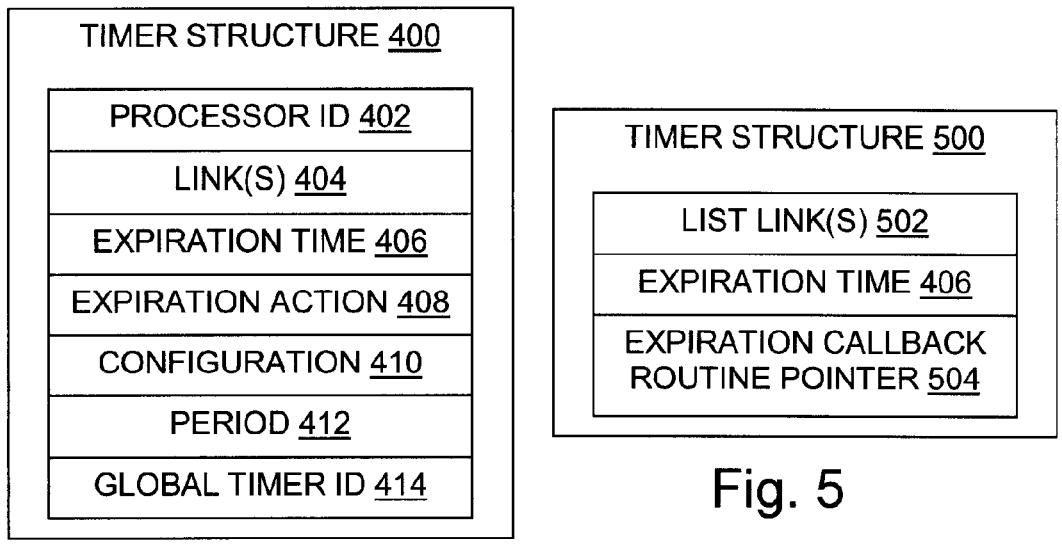
Fig. 4
Fig. 5

MANAGING TIMERS IN A MULTIPROCESSOR ENVIRONMENT

BACKGROUND

Multiprocessor environments have been designed in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

Within a multiprocessor environment, a given process may need some ability to determine or measure time. Time measurement can be useful in a process that executes at a low level near the hardware, and in a process that executes at a higher level. Timers can be used for various purposes, such as calculating an elapsed time, yielding control to share a processor among different processes, or creating a timestamp, to name a few.

Hardware components used for timing may include one or more Advanced Configuration and Power Interface timers, Advanced Programmable Interrupt Controller timers, and other counters, clocks, timers, and/or interrupt generators. Software uses such hardware components to help provide timing services within a given system.

SUMMARY

In some embodiments, a distinction is made between local timers and global timers. A local timer is associated with one logical processor. For example, a local timer which was inserted to run on a particular logical processor will be canceled from that same logical processor. A global timer may be associated with a virtual processor, and a global timer therefore may run on different logical processors at different times. For example, a global timer which was inserted on a particular logical processor may be canceled either from that logical processor or from another logical processor.

In some embodiments, global timers are synchronized with locks to prevent race conditions, whereas local timers are lockless to reduce overhead.

In some embodiments, global timers are associated with a dedicated local timer. The expiration time of the dedicated local timer is set to the earliest expiration time specified for any of the associated global timers. The global timers are tested for expiration only if their dedicated local timer expires. Accordingly, global timer synchronization overhead may be reduced by using a dedicated local timer to reduce tests for global timer expiration.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram further illustrating a timer component in an operating environment;

FIG. 4 is a block diagram illustrating a timer data structure of a timer component;

FIG. 5 is a block diagram illustrating an alternative timer data structure;

DETAILED DESCRIPTION

Overview

Figure 1:
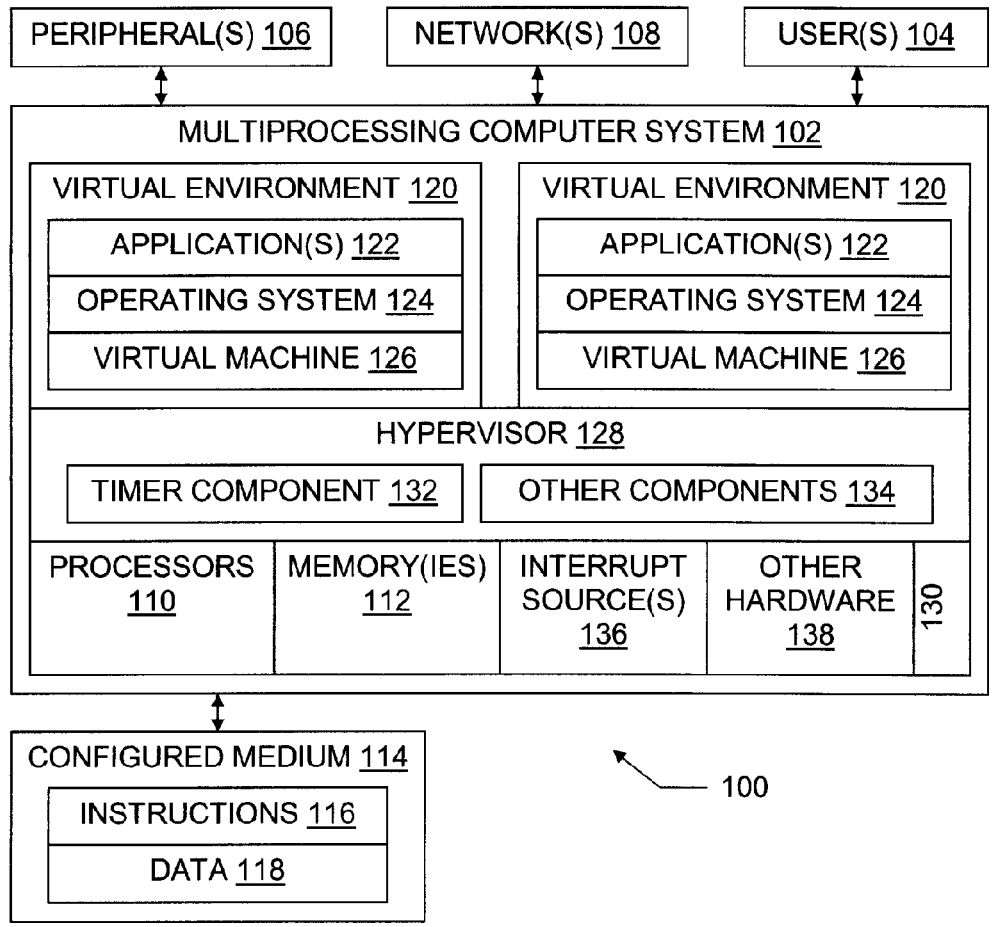
FIG. 1 is a block diagram illustrating an operating environment, as well as some system and configured storage medium embodiments.

Local timers and global timers are defined and managed in a multiprocessing environment. Local timers are local to a given logical processor. For example, a local timer may be used only within a hypervisor and be hidden from virtual machines that are hosted by the hypervisor. By contrast, a global timer may be created at the request of a virtual processor that is running in a virtual machine, and the global timer therefore travels with the virtual processor as it runs on different logical processors at different times. Synchronization, and hence the overhead of managing synchronization locks, may be required for global timers but not be required for local timers. If local timers are set more frequently than global timers, then keeping local timers lockless reduces synchronization overhead.

To further reduce synchronization overhead, global timers can be associated with a dedicated local timer. The expiration time of the dedicated local timer is set to the earliest expiration time specified for any of the associated global timers. The global timers are then tested for expiration only if their dedicated local timer expires. Thus, overhead is reduced by avoiding some of the tests for global timer expiration that would be performed if a dedicated local timer was not used. Locking operations while handling timer expiration are needed only when a dedicated local timer expires during a given hypervisor execution interval. During other hypervisor execution intervals, regular local timers (timers that are not dedicated to handling global timers) can be serviced without using locks.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s)

and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "multiprocessing computer system" may include, for example, one or more servers, motherboards, processing nodes, personal computers (portable or not), personal digital assistants, cell or mobile phones, and/or device(s) providing a plurality of processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

As used herein, a "logical processor" is a single independent hardware thread. For example a hyperthreaded quad core chip running two threads per core has eight logical processors. A "virtual processor" is a processing unit within a virtual machine. In some cases a virtual processor is mapped in a fixed manner to one particular logical processor throughout execution of an application program and/or other software. In other cases, however, a virtual processor may be mapped dynamically during execution to multiple different logical processors, one at a time.

As used herein, "timer" should be read in context because it may refer to a local timer, a global timer, or both. A "local timer" for a logical processor is always inserted on and canceled from that logical processor. A "global timer" may be canceled from a different logical processor than the logical processor on which the global timer was originally inserted. Unless indicated otherwise, both local and global timers are meant when "timer" is used without "local" or "global" as a qualifier. It will also be understood that in one context "timer" can refer to a timer considered as a whole, whereas in another context "timer" can refer to a part of a timer implementation, such as a timer data structure or a function call to create a timer. A "timer component" is a software component that contains timers for multiple logical processors.

As used herein, a "hypervisor" is a software platform which supports multiple virtual machines. For example, a hypervisor may be used to run several operating systems at the same time on a host computer.

As used herein, a "list" of items is a structure (however implemented) that includes at least one such item, and other types of items are not necessarily excluded. For instance, a "list of local timers" includes at least one local timer. Likewise, a list containing at least one local timer continues to be a "list of local timers" even if an item that is not a local timer is added to the list.

As used herein, terms referring to data structures are only as specific as their express qualifiers. For example, without further qualification, the term "list" includes both linked lists and lists implemented using an array. "Links" includes pointers and/or handles. "Linked list" includes both singly linked lists and doubly linked lists. "Doubly linked list" includes both circular doubly linked lists and other doubly linked lists. Also, whenever reference is made to a data structure, it is understood that the data structure configures a computer-readable memory, as opposed to simply existing on paper, in a programmer's mind, or as a transitory signal on a wire, for example.

Operating Environments

With reference to FIG. 1, an operating environment 100 for an embodiment may include, for instance, a multiprocessing computer system 102. Human users 104 may interact with the multiprocessing computer system 102 by using screens, keyboards, and other peripheral equipment 106. Storage devices and/or networking devices may be considered peripheral equipment 106 in some embodiments. Other computer systems (not shown), which may themselves be multiprocessors or not, may interact with the multiprocessing computer system 102 by using one or more network connections via network interface equipment 108.

The multiprocessing computer system 102 includes at least two logical processors 110. The multiprocessing computer system 102 also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the multiprocessing computer system 102 when inserted or otherwise installed, making its content accessible for use by processors 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 (possibly including data structures) which is created, modified, referenced, and/or otherwise used by execution of the instructions 116. The instructions 116 and the data 118 configure the memory 112/medium 114 in which they reside; when that memory is a functional part of a given computer system 102, the instructions 116 and data 118 also configure that computer system 102. For clarity of illustration, memories 112 are shown in a single block in FIG. 1, but it will be understood that memories may be of different physical types, and that a virtual environment 120 and other items shown in the Figures may reside partially or entirely within one or more memories 112, thereby configuring those memories.

A plurality of virtual environments 120 configure the memory(ies) 112 of the illustrated computer system 102. Each virtual environment 120 may include, for example, one or more application programs 122 which run on top of an operating system 124, which runs in turn on top of a virtual machine 126. Different application programs 122 and/or different operating systems 124 may run in different virtual environments 120. Different virtual machines 126 may also be running in different virtual environments 120.

A hypervisor 128 runs in between the virtual machines 126 and a raw hardware 130 layer. The hypervisor includes at least one timer component 132. The hypervisor 128 also includes other components 134, such as a scheduler that assigns processors 110 to tasks/threads/processes/etc. In some embodiments the virtual machines 126 are considered part of the hypervisor 128. One suitable hypervisor 128 is the Microsoft® Hyper-V™ hypervisor (marks of Microsoft Corporation), but embodiments are not limited to articles, methods, or systems involving the Hyper-V™ hypervisor.

Hardware 130 in a hardware layer includes processors 110, memories 112, interrupt sources 136, and other hardware 138. Interrupt sources 136 may include Advanced Configuration and Power Interface timers, Advanced Programmable Interrupt Controller timers, and other counters, clocks, timers, and/or interrupt generators. Other hardware 138 may include controllers, converters, power sources, graphics engines, and I/O devices, for example.

Figure 2:
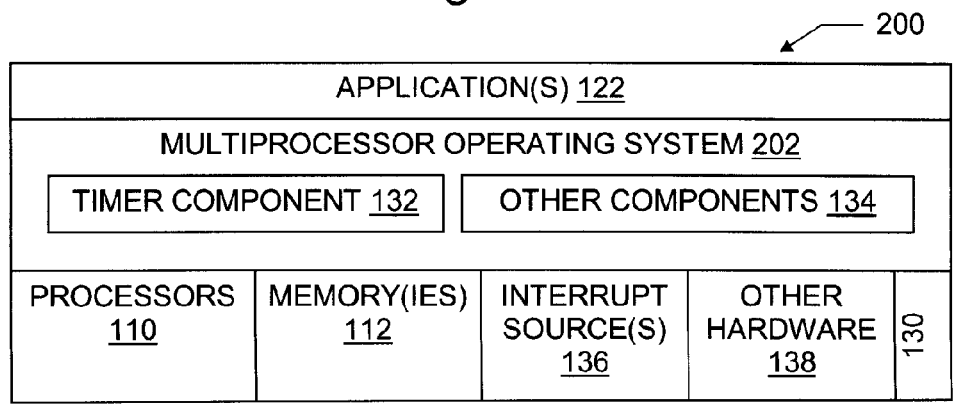
FIG. 2 is a block diagram illustrating an alternative operating environment and embodiments.

FIG. 2 shows an alternative operating environment 200. Unlike the first operating environment 100, this alternative operating environment 200 includes a multiprocessor operating system 202 running on the hardware 130, instead of a hypervisor 128. Like operating systems 124, the multiprocessor operating system 202 provides a platform for application programs 122, and perhaps even for some of the same application programs 122 that run elsewhere in a virtual environment 120. Unlike the first operating environment 100, however, this alternative operating environment 200 has only one operating system, so all application programs 122 running in operating environment 200 must be compatible with the multiprocessor operating system 202.

Like the hypervisor 128, the multiprocessor operating system 202 includes a timer component 132. The timer component 132 in the multiprocessor operating system 202 does not necessarily provide the same functionality in the same way as the timer component 132 in the hypervisor. Similarly, the multiprocessor operating system 202 includes a scheduler and other components 134, albeit not necessarily the exact same components 134 as in the hypervisor.

In a given operating environment, the multiprocessing computer system may run any operating system 124 and/or any multiprocessor operating system 202 having a timer component 132 as taught herein, and may use any network interface equipment 108, now known or hereafter formed. An operating environment may include one or more multiprocessing computer systems that are clustered, client-server networked, and/or peer-to-peer networked. Some operating environments include a stand-alone (non-networked) multiprocessing computer system.

Systems

Referring now to FIGS. 1 through 3, some embodiments include a computer system configured for multiprocessing, such as a multiprocessing computer system 102 running virtual machines 126, or a multiprocessing computer system with hardware 130 running a multiprocessor operating system 202. Such a multiprocessing computer system includes at least one memory 112 configured with executable instructions 116, and a plurality of logical processors 110 which manage timers 300 when executing at least a portion of the instructions.

In particular, some embodiments include at least one local timer 302, which is characterized as local to a logical processor 110 in that, by execution of instructions 116, the local timer 302 was inserted on and will be canceled from that logical processor 110. Some embodiments include at least one global timer 304, which is characterized as global to a logical processor 110 in that the global timer 304 was inserted by instructions running on that logical processor 110 and may be canceled by instructions running on that logical processor or by instructions running on another logical processor.

In some embodiments, the multiprocessing computer system is further characterized in that the global timer 304 is serviced by execution of the instructions 116 in response to expiration of a local timer 302. Depending on the embodiment, servicing a global timer may include operations such as checking to see whether the global timer has expired, positioning the global timer in a list or other arrangement of timers, sending a signal if the global timer has expired, invoking a callback routine if the global timer has expired, and/or programming a hardware interrupt source 136 based at least in part on an expiration time stated in the global timer.

Some embodiments include a configured computer-readable storage medium 114, which is an example of a memory 112. In a multiprocessing environment, memory 112 may include disks (magnetic, optical, or otherwise), RAM, EEPROMS or other ROMs, and/or other configurable memory. A general-purpose memory 112, which may be removable or not, and may be volatile or not, is configured with data structures and data 118 and instructions 116, from a removable medium 114 and/or another source such as a network connection, to thereby form a configured medium in the form of configured memory 112 which is capable of causing a multiprocessing system to perform timer management steps and provide timer functionality disclosed herein. FIGS. 1 through 3 thus help illustrate configured storage media embodiments, as well as system embodiments and method embodiments.

In some embodiments, peripheral equipment 106 such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment 108 such as a packet-switched network interface card, a wireless transceiver, or a telephone network interface, for example, will be present in the multiprocessing system. However, an embodiment may also communicate through direct memory access, removable nonvolatile media, or other information storage-retrieval and/or transmission approaches, or an embodiment in a computer system may operate without communicating with other computer systems.

In some embodiments, the multiprocessing computer system includes a hypervisor 128. Instructions for managing timers 300, such as instructions 116 which insert local timers 302 on a logical processor 110 and instructions 116 which cancel local timers 302 from a logical processor 110, are located within the hypervisor 128, in a timer component 132.

The instructions 116 may include a timer API 306, such as a procedure that can be called by an operating system 124 to create a global timer 304, and a procedure the operating system can call to cancel a specified global timer 304. In some embodiments, the API is part of a timer component. In some, the API is outside the timer component but calls on the timer component to create a global timer. Timers may be specified in the API 306 by text strings, handles, GUIDS, pointers, and/or other identifiers. The timer API 306 may provide various capabilities for timers associated with a given process/thread/task and/or with a given logical processor, such as single-shot global timers 304, modulated periodic global timers 304, lazy periodic global timers 304, global timers 304 that send a signal on expiration, and global timers 304 that invoke on expiration a callback routine identified by the timer API caller.

In one embodiment, all instructions that directly access local timers 302 are hidden from the hosted operating systems 124. That is, local timers 302 are accessed only by the hypervisor 128 code, and only global timers 304 can be created or identified in a public procedure of the timer API 306.

In some embodiments, a global timer 304 includes a callback routine to be invoked if the global timer expires. The callback routine may be identified by a memory pointer, an index, a handle, or another routine identifier.

One embodiment includes a hypervisor 128 which executes instructions 116 on the logical processors 110, and a plurality of operating systems 124, each of which executes instructions on at least one logical processor 110. The hypervisor 128 includes one or more instructions which disable interrupts after the hypervisor receives control from an operating system. The hypervisor 128 also includes at least one instruction 116 to service a timer by programming a hardware interrupt source 136 before passing control back up to an operating system 124. In some embodiments, interrupt disabling and/or interrupt enabling are performed by hypervisor code located outside the timer component.

In general, interrupts may be caused by I/O devices, timers, special memory accesses, and/or other sources. In one embodiment, at least some interrupts are disabled inside the hypervisor 128. As a result, the hypervisor code need not handle the case in which a timer interrupt occurs during handling of a timer interrupt. If an interrupt occurs during hypervisor execution, the interrupt is undetected until control returns up to the operating system 124 level. The time spent within the hypervisor is kept short, e.g., less than one hundred microseconds, before control is passed back up to the operating system 124 level. From the operating system 124 level, the hypervisor 128 looks like hardware, at least with regard to operating speeds. In one embodiment, locks to control access to local timers 302 are not used within the hypervisor 128. Avoiding interrupts and locks within the hypervisor 128 may increase hypervisor scalability with respect to the number of logical processors 110 present in a system.

In one embodiment, there is no periodic time tick within the hypervisor 128, but a fine grained passage of time is achieved by letting the hypervisor execute only for a short while before passing control back to the operating system 124 level. Shortness of time may be defined in terms of real time, e.g., a time less than one hundred microseconds is an example of a short time. Shortness may also be defined pragmatically, e.g., a length of time less than the average response time of any attached peripheral device 106 is considered short. On leaving the hypervisor 128, a hardware interrupt is programmed to bring control back to the hypervisor and then interrupts are enabled before control is passed back to the virtual machine.

In one embodiment, the multiprocessing computer system operates without requiring a central data structure for synchronizing time across multiple logical processors 110. Global times on different logical processors 110 may be out of sync with one another.

Although the Figures show a timer component 132 and other components 134 in separate blocks, a given embodiment may include timer-related instructions 116 in one or more components, modules, processes, tasks, routines, functions, structures, classes, handlers, and so on. In one embodiment, for example, the system includes a scheduler component 134 which sets expiration times in global timers 304, and hence may be viewed as containing timer component 132 instructions.

Timers 300 may be implemented using records, struts, classes, or other data structures, using a list, tree, bucket, or other arrangement, for example. Two timer structures 400, 500 are illustrated in FIGS. 4 and 5. Embodiments are not limited to the timer structures shown.

A processor id field 402 identifies a logical processor 110 corresponding to a timer 300 that is represented by the timer structure 400.

One or more link 404 fields, such as memory pointers, handles, or array indices, identify other timer structures 400 that are associated with the particular timer structure in a given arrangement.

An expiration time 406 field, such as a time data structure composed of one or more counters, specifies a time at which the timer is considered to have expired. In some embodiments, the timer effectively expires on or at any time after the specified expiration time 406, but not before; no prediction is easily made as to when the timer will be checked for expiration. In other embodiments, a timer effectively expires on the specified expiration time 406, or very near that time, because timers are checked frequently for expiration.

An expiration action 408 field specifies an action to be taken on or after expiration of the timer represented by the timer structure 400. In some cases, no action is expressly specified; a given timer 300 may have been created in a given embodiment to cause an action which always occurs in that embodiment when that type (global, local) of timer is serviced. In some cases, the expiration action 408 specified is a signal, such as sending a message, setting a bit flag, etc. In some cases, the expiration action 408 specified is a callback routine to be invoked and executed.

A configuration 410 field specifies configuration values. For example, the role of a timer with respect to processors (global, local) may be implicit in the position of the timer structure 400 within a data arrangement, or it may be explicit in a configuration field bit value. If the timer structure 400 represents a global timer 304, then the configuration 410 may specify that the global timer 304 is periodic (recurring) and may specify the timer's period. The timer's period may also be stored in a separate place such as a period 412 field. Conversely, the configuration 410 may specify that the global timer 304 is not periodic, namely, that it is a one-shot.

Configuration 410 bits may also specify whether a periodic global timer 304 is modulated or lazy. In one embodiment, periodic global timer expirations may be delayed or missed because the logical processor used to mark them was unavailable to the timer component 132. After a logical processor has been unavailable for at least one period of a timer, a modulated periodic global timer 304 shortens the timer's period until the timer catches up, giving periodic expirations more frequently than would otherwise occur. A lazy periodic global timer defers expiration until the processor is available; some expirations may be skipped entirely.

Operations implemented in other contexts might be characterized as lazy in some sense. Within the Windows NT (mark of Microsoft) kernel, for example, a request that the kernel/Hardware Abstraction Layer switch interrupt request level does not always cause an immediate write to hardware. Also, the x64 architecture allows an exception to be generated whenever an operation that uses the floating point unit is encountered, and in some instances the kernel lazily switches floating point state in a manner similar to lazy switching of cold registers.

A timer ID 414 field contains a handle, GUID, or other global timer 304 identifier. The timer ID may be returned by an API function that creates a global timer 304, so that the timer ID is available to identify that global timer in a subsequent API call to cancel that global timer, if necessary.

Figure 6:
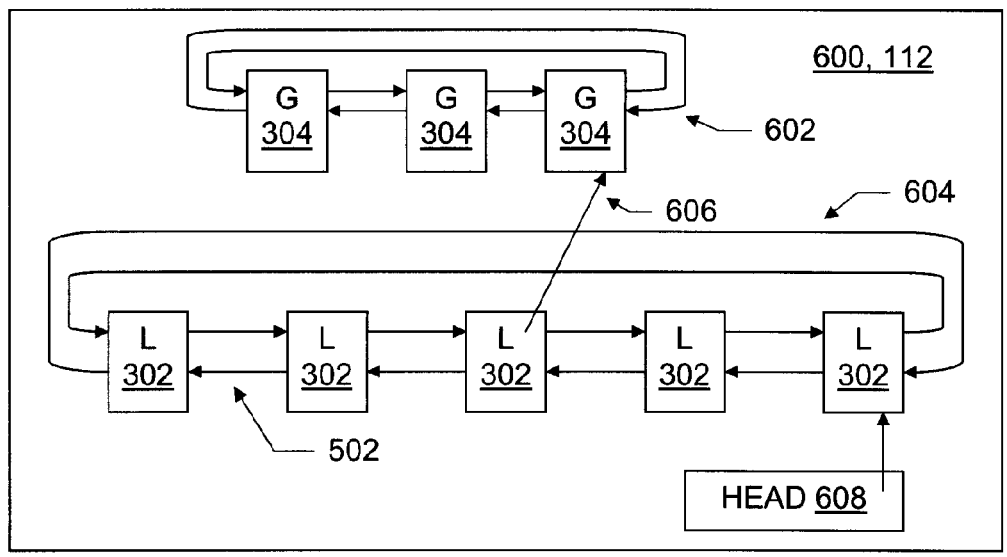
FIG. 6 is a diagram illustrating an arrangement of timer data structures configuring a memory, namely, one doubly linked circular list of global timers associated with one dedicated local timer in a doubly linked circular list of local timers.
Figure 7:
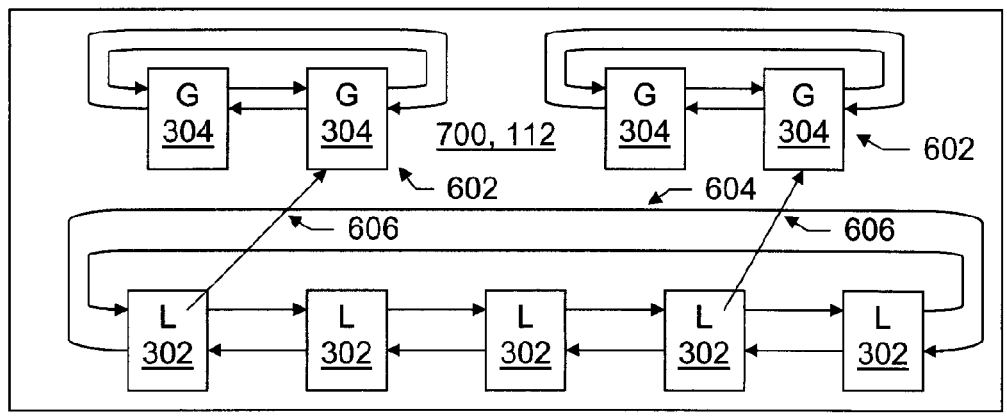
FIG. 7 is a diagram illustrating an alternative arrangement of timer data structures configuring a memory, namely, a plurality of doubly linked circular lists of global timers, each of which is associated with a different dedicated local timer in a doubly linked circular list of local timers.
Figure 8:
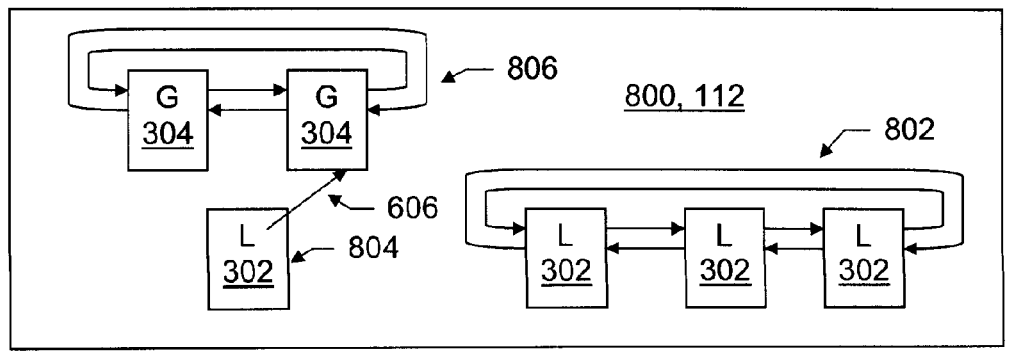
FIG. 8 is a diagram illustrating another alternative arrangement of timer data structures configuring a memory, namely, a doubly linked circular list of global timers which is associated with a standalone dedicated local timer, and a doubly linked circular list of local timers having no associated global timers.

Timer structure 500 omits the processor ID field 402 because the identity of the processor on which the timer structure 500 is inserted is implicit in the timer structure's location in memory 112. The list links 502 in timer structure 500 are pointers to other instances of timer structure 500 in a linked list. Some of the many suitable linked list arrangements are shown in FIGS. 6 through 8, and will be discussed further below. The expiration action field in timer structure 500 is an expiration callback routine pointer 504, which gives the memory address of a routine to be invoked when the timer represented by the timer structure 500 expires and is being serviced. Configuration 410 values are omitted from timer structure 500, because they are either not provided in a given embodiment or they are implicit in the location of the timer structure 500 in memory 112 relative to other data 118. A variation of timer structure 500 which includes a timer ID 414 can be used to represent global timers 304; local timers 302 do not require the timer ID field because they are not visible outside the hypervisor 128.

Timer structures 400, 500 may be part of a timer component 132. In some timer component 132 embodiments, timer structure field values are part of the timer component data 118, and procedures for setting expiration times, reading expiration times, and otherwise using the timer structures are part of the timer component instructions 116.

With reference now to FIGS. 6 through 8, local timers 302 and global timers 304 may configure a memory 112 in various ways, depending on the embodiment. One aspect of several embodiments is that global timers 304 are associated with local timers 302 in such a way that global timer structures are checked for expiration only when their corresponding local timer expires. Because local timers are inserted and canceled on a given processor 110, associating global timers with local timers reduces or eliminates the need for spinlocks or other timer synchronization mechanisms, which helps make timer component 132 code simpler, faster, more robust, and more scalable.

FIG. 6 shows an example arrangement 600 of timer 300 structures configuring a memory 112. In this arrangement 600 and similar arrangements, global timers and local timers may be implemented using timer structure 400 and/or timer structure 500, for example. Global timers are indicated in FIGS. 6 through 8 for convenience as boxes labeled with a "G" for global and with reference number 304. Local timers are indicated as boxes labeled with an "L" for local and with reference number 302. List links 502 are indicated by arrows.

The arrangement 600 includes a linked list 602 of global timers. The list 602 is associated with a dedicated local timer 302 by a link 606 from that local timer's structure to a global timer 304 structure in the list 602 of global timers. This dedicated local timer 302 is an element of a linked list 604 of local timers, whose first element is identified by a head pointer 608. The lists 602 and 604 shown are doubly linked circular lists, but other types of list may also be used in a given embodiment, and it is not required that both lists 602, 604 be the same type. Indeed, arrangements other than lists could be used, such as a sorted tree.

One embodiment in a multiprocessing system includes a list containing local timers 302 for a given logical processor 110. Another list contains global timers 304 for that logical processor 110, and the list of global timers is associated by at least one link with one local timer in the list of local timers.

FIG. 7 shows an alternative arrangement 700 configuring a memory 112. In this arrangement 700, two dedicated local timers 302 in a list of local timers each have an associated list of global timers 304. FIG. 8 shows another arrangement 800, in which one list 802 configuring memory includes only local timers 302 which have no associated global timer 304, and another "list" 804 always containing a single dedicated local timer 302 links to a list 806 containing any global timers 304 inserted on the processor 110. More generally, the number of global timer lists, the number of global timers in each list, and the number of local timers, may each vary in different embodiments and/or at different times during execution of a hypervisor 128 or a multiprocessor operating system 202 that uses lists of timer structures.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples.

Methods

Figure 9:
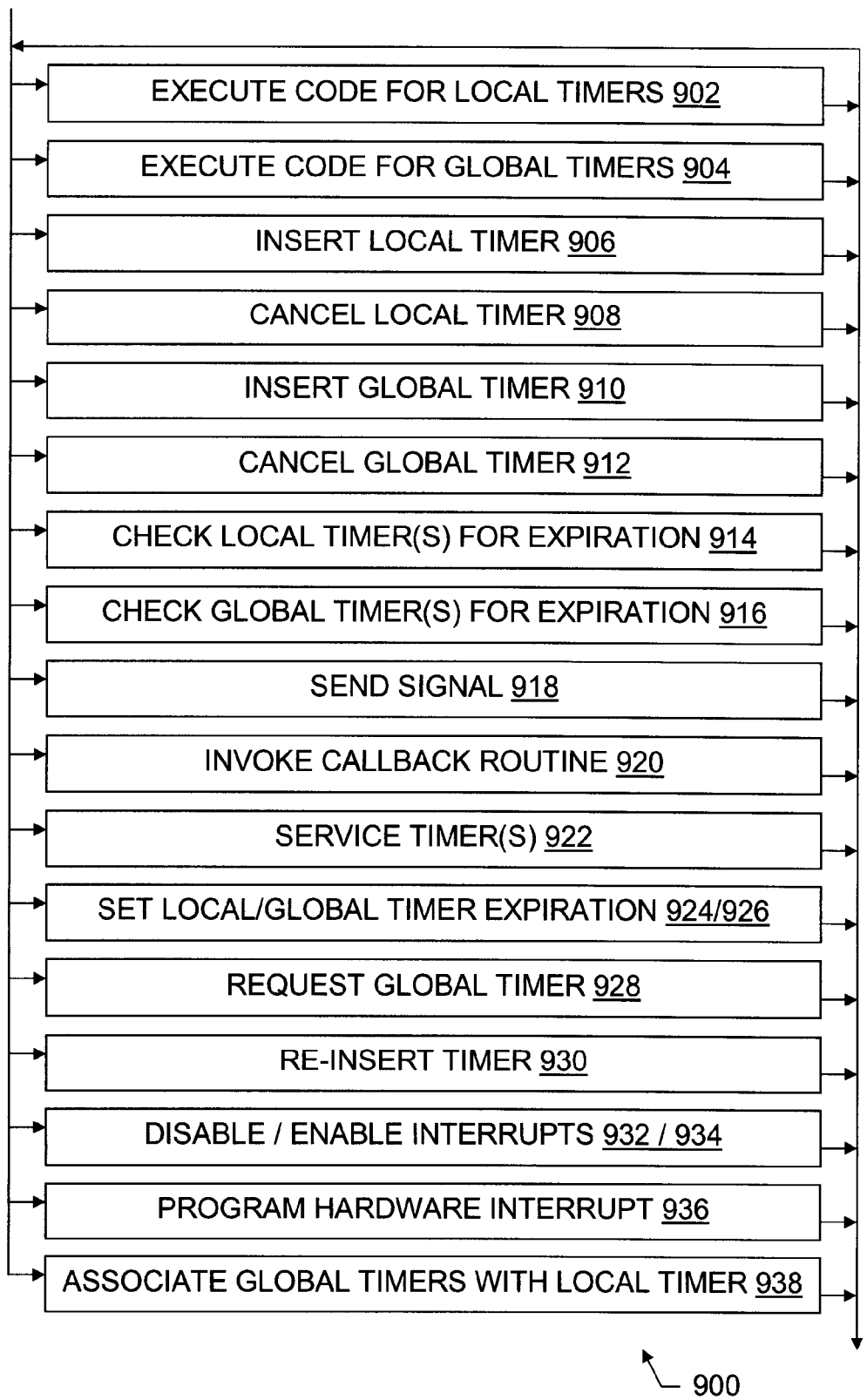
FIG. 9 is a flow chart illustrating steps of some method and configured storage medium embodiments.

FIG. 9 illustrates some method embodiments in a flowchart 900. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 900 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a local timer code executing 902 step, a logical processor 110 executes instructions 116 which operate on at least one local timer 302. The executed code may be part of a hypervisor 128 or part of a multiprocessor operating system 202, for example. Results of executing 902 local timer code may vary. Executing 902 local timer code may include, in particular, performing other steps shown in FIG. 9 such as inserting 906 a local timer 302 in a list, canceling 908 a local timer 302, checking 914 a local timer 302 for expiration, sending 918 a signal in response to expiration of a local timer 302, invoking 920 a callback routine to which a local timer 302 contains an expiration callback routine pointer 504, setting 924 a local timer 302 expiration time 406, re-inserting 930 a local timer 302, and/or programming 936 a hardware interrupt which causes one of the foregoing steps.

During a global timer code executing 904 step, a logical processor 110 executes instructions 116 which operate on at least one global timer 304. The executed code may be part of a hypervisor 128 or part of a multiprocessor operating system 202, for example. Results of executing 904 global timer code may vary. Executing 904 global timer code may include, in particular, performing other steps shown in FIG. 9 such as inserting 910 a global timer 304 in a list, canceling 912 a global timer 304, checking 916 a global timer 304 for expiration, sending 918 a signal in response to expiration of a global timer 304, invoking 920 a callback routine to which a global timer 304 contains an expiration callback routine pointer 504, setting 926 a global timer 304 expiration time 406, re-inserting 930 a global timer 304, and/or programming 936 a hardware interrupt which causes one of the foregoing steps.

During a local timer inserting 906 step, a local timer 302 is inserted on a particular logical processor 110. This may be achieved, for example, by allocating memory and populating that memory with data to thereby insert a timer structure, such as timer structure 400 or timer structure 500, on a list, such as list 604 or list 802, which is associated with the logical processor 110. A list 604 or list 802 may be associated with a logical processor 110 expressly by a processor ID, or implicitly by a relative position in a memory 112, for example.

During a local timer canceling 908 step, a local timer 302 previously inserted on a particular logical processor 110 is canceled. This may be achieved, for example, by adjusting list links 502 to exclude a timer structure 400, 500 from a list or other arrangement, and then marking as available the memory previously allocated to that timer structure.

During a global timer inserting 910 step, a global timer 304 is inserted on a particular logical processor 110. This may be achieved, for example, by allocating memory and populating that memory with data to thereby insert a timer structure such as timer structure 400 or timer structure 500 on a list such as list 602 or list 806 which is associated with the logical processor 110. A list of global timers may be associated with a logical processor by associating the list of global timers with a local timer 302 of that logical processor, for example.

During a global timer canceling 912 step, a global timer 304 previously inserted on some logical processor 110 is canceled. This may be achieved, for example, by adjusting list links 502 to exclude a timer structure 400, 500 from a list or other arrangement, and then marking as available the memory previously allocated to that timer structure. Cancellation of a global timer from one logical processor 110 may be initiated (and in some embodiments may be fully performed) by instructions 116 that are running on that processor 110, or by instructions that are running on a different processor 110. For example, a virtual processor that is running the global timer may have been moved from the original logical processor to another logical processor. Locks or other synchronization mechanisms are used when canceling or otherwise modifying global timers, in order to prevent race conditions.

During a local timer expiration checking 914 step, a local timer 302 is checked for expiration. This may be achieved, for example, by comparing an expiration time 406 in a timer structure for the local timer 302 with a logical processor's local time counter to see if the expiration time has been reached or passed. The local time counter may be based, for example, on one or more register values obtained from a hardware 130 device such as an Advanced Configuration and Power Interface or an Advanced Programmable Interrupt Controller.

During a global timer expiration checking 916 step, a global timer 304 is checked for expiration. When global timers 304 are associated with local timers 302 as discussed herein (e.g. by a link 606), checking a local timer can be sufficient to determine that an associated global timer has not yet expired. Only if the associated local timer has expired will the global timer(s) be checked.

During a signal sending 918 step, familiar tools and techniques are used to send a signal, e.g., to another process and/or to another processor, in response to expiration of a timer. Sending 918 a signal is an example of an expiration action 408 available in some embodiments.

During a callback routine invoking 920 step, familiar tools and techniques are used to invoke (pass control to while preserving present context) a callback routine in response to expiration of a timer. The callback routine code may be inline, or it may be identified by an expiration callback routine pointer 504, or an index, for example.

During a timer servicing 922 step, an expiration action 408 is taken for an expired timer 300, and the timer is then canceled (if it was a one-shot) or re-inserted (if it is periodic). An expiration action 408 may specify sending 918 a signal and/or invoking 920 a callback routine, for example.

During a local timer expiration setting 924 step, an expiration time is set for a local timer 302. This may be achieved, for example, by placing a value in an expiration time 406 field. If the local timer 302 has one or more associated global timers 304, then in some embodiments the expiration time 406 in the local timer 302 is set to the minimum (earliest time) of the expiration time(s) of the associated global timer(s), in order to help reduce or eliminate accesses to the global timer (s) when checking 916 them for expiration.

During a global timer expiration setting 926 step, an expiration time is set for a global timer 304. This may be achieved, for example, by placing a value in an expiration time 406 field of a timer structure 400, 500 that helps implement the global timer 304.

During a global timer requesting 928 step, a hosted operating system 124, for example, uses an API 306 call to request creation of a global timer 304. In some embodiments, local timers 302 are not visible through the API 306. The global timer request 928 may specify an expiration time expressly, or implicitly by some previously established or default value. The global timer request 928 may specify configuration values, such as whether the timer is to be periodic with a specified period 412 or is to be a one-shot, and if periodic whether the timer is lazy. The request 928 may also specify an expiration action 408, such as a signal or a callback routine.

During a timer re-inserting 930 step, a timer 300 is re-inserted in a list or other arrangement of structures. Re-insertion 930 may be done to keep timers in a list or tree sorted in order according to their respective expiration times. Re-insertion 930 may be accomplished by changing links 404 or list links 502, so that when the linked arrangement is traversed the timers are encountered in the desired order.

During an interrupt disabling 932 step, some or all interrupts are disabled. This may be achieved, e.g., by executing a processor-specific instruction designed to disable interrupts, or by setting/clearing a bit or bits in an interrupt mask.

During an interrupt enabling 934 step, disabled interrupts are re-enabled. This may be achieved, e.g., by executing a processor-specific instruction designed to enable interrupts, or by toggling the bit or bits in an interrupt mask that were used to disable interrupts.

During a hardware interrupt programming 936 step, an interrupt source 136 is programmed to cause a later interrupt on a given processor 110. For example, a countdown value may be set within an interrupt controller chip or chipset, such that an interrupt will generated after a specified number of hardware clock cycles.

During an associating 938 step, one or more global timers 304 are associated with a local timer 302 such that the local timer's expiration time is the earliest of the expiration times of the associated global timers. That is, if the expiration time in this local timer has not yet been reached, then the expiration time of the associated global timers will also not yet have been reached. A local timer having such associated global timers is sometimes referred to herein as a "dedicated" local timer. Some embodiments allow only one dedicated local timer per processor 110 (e.g., as shown in FIGS. 6 and 8), while other embodiments allow multiple dedicated timers (e.g., as shown in FIG. 7) for a given logical processor. The global timers may be associated 938 with a dedicated local timer by one or more links 404, for example, such as the link 606.

In some embodiments, steps shown in FIG. 9 are performed in a coordinated manner to provide timer management.

For example, in one embodiment a hypervisor 128 provides a timer component 132 that allows callers within the hypervisor to insert 906/910 a timer 300 by specifying the expiration time for the timer and an optional callback routine to invoke 920 when the timer expires. If no callback routine is specified then the caller is sent 918 a signal to indicate that the timer expired. The timer may be cancelled 908/912 at any time. A timer may be inserted 906/910 at any time and if the timer has already been inserted then it is automatically cancelled 908/912 from its current location and then inserted 930 again, to maintain the desired order of timers.

In one embodiment, the timer component 132 allows callers to manage both local timers 302 and global timers 304. A local timer 302 is inserted 906 and cancelled 908 on a particular logical processor 110. A global timer 304 may be cancelled 912 from a different logical processor than the logical processor 110 on which it was originally inserted. Synchronization is used to manage global timers, e.g., by allowing changes to a global timer only by a caller that has obtained a lock for that global timer.

In one embodiment, the timer component 132 programs 936 the hardware 130 on a processor 110 to deliver a hardware interrupt to the processor 110 at the earliest expiration time 406 of any local timer 302 or global timer 304 currently inserted on this processor 110. The timer component 132 also provides a timer interrupt handler 308 which fields the hardware interrupt. The timer interrupt handler 308 services each expired timer by invoking 920 the timer's callback routine or sending 918 a signal to the caller that the timer has expired.

By programming 936 the hardware 130 layer to deliver an interrupt on the earliest upcoming expiration of an inserted timer, timers with fine resolution can be supported. The timer resolution can be driven by the resolution supported by the hardware, in the sense that finer timer interrupt resolution in hardware permits finer timer resolution in software. In one embodiment, if there are no inserted timers present on a processor 110 then hardware interrupt sources 136 are programmed (expressly or implicitly) to not deliver an interrupt, thereby saving the overhead of a wasted interrupt.

Some embodiments use one API 306 to manage local timers 302 and a different API 306 to manage global timers 304. In some embodiments, callers within a hypervisor 128 use an API 306 to insert and cancel local timers 302. In some embodiments, local timers 302 are maintained in a per-processor list, e.g., as shown in FIGS. 6 through 8. The timers in the list are maintained in increasing order of the expiration time so the timer to expire the earliest is at the head of the list. Interrupts are disabled 932 in some hypervisors 128 so there is no need for mutual exclusion between a timer interrupt handler 308 servicing the timers and any API 306 calls. This design avoids synchronization overhead for local timers 302 and reduces overhead for global timers 304.

Some embodiments include a dedicated local timer 302 to service global timers 304. A separate per-processor list, such as a list 602 or a list 806, is maintained for global timers 304 inserted on a processor 110. This list of global timers 304 is also ordered on expiration time, like the list of local timers 302. Synchronization is required while inserting 910 or canceling 912 global timers from the list. A per-processor local timer 302 is used to service the global timers 304; the list of global timers is associated 938 with the dedicated local timer, e.g., by a link 606. An expiration callback routine pointer 504 for this dedicated local timer is set to point to a routine that examines the list of global timers for expired global timers and invokes the expiration action 408 routine or signal of each expired global timer.

Some embodiments insert 910 a global timer 304 in the following manner. Links 404 are set such that the global timer 304 is added to the processor's list of global timers. If this newly inserted global timer 304 is added to the head of the list of global timers, then the associated local timer 302 which is dedicated for servicing global timers is (re-)inserted in the list of local timers. The expiration time 406 of this dedicated local timer is set to the expiration time of the global timer 304 which is at the head of the list of global timers.

Some embodiments service 922 a global timer 304 in the following manner. Upon expiration of a dedicated local timer for global timers, the callback routine of the dedicated local timer is invoked 920 to service expired global timers that are associated 938 with the expired dedicated local timer. Each expired global timer 304 is removed from the list of global timers, and that expired global timer's expiration action 408 routine is invoked. If no global timers remain on the global timer list then the dedicated local timer is not re-inserted in the list of local timers. Otherwise the dedicated local timer is inserted in the list of local timers and is set to expire at the same time as the global timer which is now at the front of the list of global timers.

An embodiment may reduce or remove synchronization overhead for timers. In some embodiments, local timers are programmed (inserted or cancelled) at a higher frequency than global timers. In some embodiments, local timers have a finer resolution than global timers. By using a local timer to service the global timers, a timer interrupt handler only needs to examine the list of local timers for expired timers; the global timers are serviced automatically if the local timer inserted on their behalf has expired. Similarly, a routine to program 936 the hardware to the earliest upcoming expiration time among all local and global timers on the processor can directly use the expiration time of the local timer at the head of the list. Since the global timers on the processor are not considered in either case, the embodiment helps keep these performance sensitive routines simple and free from mutual exclusion considerations. When local timers are handled more frequently than global timers, using dedicated local timers as described herein thus results in greater efficiency.

Some embodiments include a method for managing timers for multiple logical processors 110. An executing 902 step executes computer instructions 116 which manage local timers 302. Executing computer instructions 116 which manage local timers 302 may include maintaining a list of local timers which are sorted in increasing order according to their respective expiration times 406. An executing 904 step executes computer instructions 116 which manage global timers 304. A servicing step services 922 global timers 304 for a given logical processor 110 only in response to expiration of a dedicated local timer 302 for that logical processor 110, namely a local timer with which the global timers are associated 938 by a link 606.

Some embodiments include the step of requesting 928 insertion of a global timer 304; this request may be made, for example, by a hosted operating system 124. In some embodiments, the step of servicing global timers occurs in response to invocation 920 of a callback routine for a dedicated local timer, namely, the local timer that is associated with the global timers. In some, the step of servicing 922 global timers includes examining a list of global timers, finding an expired global timer in the list, and performing an expiration action 408 for the expired global timer. Some embodiments include the steps of determining that at least one global timer 304 is associated with the local timer, (re)inserting 906/930 the local timer in a list of local timers, and setting 924 the local timer to expire at the earliest expiration time that is specified for any global timer 304 that is associated (e.g., by a link 606) with the local timer.

Configured Media

Some embodiments provide a storage medium configured with computer data and computer instructions, such as data 118 and instructions 116, for performing a method of managing timers as discussed above. The storage medium which is configured may be a memory 112, for example, and in particular may be a removable storage medium 114 such as a CD, DVD, or flash memory.

The method characterized by the configured medium may be, for example, a method for managing timers for multiple logical processors 110 in an environment 100 which also contains a hypervisor 128 and a plurality of hosted virtual machines 126. The computer data 118 may include local timer 302 structures and global timer 304 structures and arrangements, such as those illustrated in FIGS. 4 through 8.

In some embodiments, the method includes executing 902 computer instructions which manage the local timer structures such that a local timer structure for a logical processor is always inserted on and canceled from that logical processor; executing 904 computer instructions which manage the global timer structures such that a global timer structure for a logical processor that was inserted on one logical processor may be canceled from that logical processor or from another logical processor; and associating 938 via insertions 906, 910, 930 and a link such as link 606 the global timer structures for a logical processor 110 with one of the local timer structures for that logical processor. In some embodiments, the computer data 118 configuring the storage medium includes a doubly linked list of local timer structures, e.g., a list 604. In some, the computer data 118 includes a linked list of global timer structures and a link in a local timer structure associating 938 the linked list of global timer structures with the local timer structure. Regardless of the type of list or other arrangement used, which may be different in different embodiments, the hypervisor 128 provides timers for the hosted virtual machines. The hypervisor 128 may also provide timers for internal hypervisor usage, such as a time slice timer. In particular, global timers may be used by hypervisor components in addition to being used by hosted virtual machines.

In some embodiments, the computer instructions 116 do not provide any of the hosted virtual machines with direct access to local timer structures. As a result, hosted virtual machines may only request insertion of global timers; the local timers are hidden from the hosted virtual machines.

In some embodiments, the computer instructions 116 read an earliest upcoming expiration time 406 from a local timer structure of a logical processor 110 and then program 936 a hardware interrupt to occur for the logical processor no sooner than the earliest expiration time. This earliest expiration time is the earliest of the expiration times of all of the timers then present on the logical processor 110.

CONCLUSION

Although particular embodiments are expressly illustrated and described herein as methods, configured media, or systems, it will be appreciated that discussion of one type of embodiment also generally extends to other embodiment types. For instance, the descriptions of methods in connection with FIG. 9 also help describe configured media, as well as the operation of systems like those described in connection with FIGS. 1 though 8. It does not follow that limitations from one embodiment are necessarily read into another. In particular, methods are not limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for managing timers for multiple logical processors, comprising the steps of:
   executing computer instructions which manage local timers, a local timer characterized in that a local timer for a logical processor is always inserted on and canceled from that logical processor;
   executing computer instructions which manage global timers, a global timer characterized in that a global timer for a logical processor is always inserted on that logical processor but may be canceled from that logical processor or from another logical processor; and
   servicing global timers for a given logical processor only in response to expiration of a local timer for that logical processor.

2. The method of claim 1, wherein the step of servicing global timers occurs in response to invocation of a callback routine for the local timer that is associated with the global timers.

3. The method of claim 1, wherein the step of servicing global timers includes examining a list of global timers, finding an expired global timer in the list, and performing an action for the expired global timer.

4. The method of claim 1, wherein the method comprises the steps of determining that at least one global timer is associated with the local timer, inserting the local timer in a list of local timers, and setting a local hardware timer to expire at the earliest of (a) the earliest expiration time that is specified for any global timer that is associated with the local timer, and (b) the earliest expiration time of any local timer in the list of local timers.

5. The method of claim 1, wherein the method further comprises the step of requesting insertion of a global timer.

6. The method of claim 1, wherein the method comprises the step of re-inserting a timer.

7. The method of claim 1, wherein the step of executing computer instructions which manage local timers comprises maintaining a list of local timers which are sorted in order according to respective expiration times.

8. A computer system configured for multiprocessing, comprising:
   at least one memory configured with executable instructions;

a plurality of logical processors which manage timers when executing at least a portion of the instructions;

a dedicated local timer, which is characterized as local to a logical processor in that, by execution of at least one of the instructions, the dedicated local timer was inserted on and will be canceled from that logical processor;

at least one additional local timer; and at least one global timer, which is characterized as global to a logical processor in that, by execution of at least one of the instructions, the global timer was inserted on that logical processor and may be canceled from that logical processor or from another logical processor, the global timer being associated with the dedicated local timer for service in response to expiration of the dedicated local timer.

9. The system of claim 8, further comprising a hypervisor, wherein instructions which insert local timers and instructions which cancel local timers are located within the hypervisor.

10. The system of claim 8, further comprising a procedure an operating system can call to create a global timer.

11. The system of claim 8, wherein the global timer comprises a callback routine to be invoked if the global timer expires.

12. The system of claim 8, further comprising a hypervisor which executes instructions on the logical processors, and a plurality of operating systems, each of which executes instructions on at least one logical processor, wherein the hypervisor includes at least one instruction to disable interrupts after the hypervisor receives control from an operating system, and wherein the hypervisor includes at least one instruction to service a timer by programming a hardware interrupt before passing control to an operating system.

13. The system of claim 8, wherein the system operates without requiring a central data structure for synchronizing time across multiple logical processors, thereby allowing global times on different logical processors to be out of sync with one another.

14. The system of claim 8, wherein the system comprises a time slice timer.

15. The system of claim 8, wherein a list in the system contains local timers for a given logical processor, another list in the system contains global timers for that logical processor, and the list of global timers is associated with one local timer in the list of local timers.

16. A storage medium configured with computer data and computer instructions for performing a method of managing timers for multiple logical processors in an environment which also contains a hypervisor and a plurality of hosted virtual machines, the computer data comprising local timer structures and global timer structures, the method comprising:

executing computer instructions which manage the local timer structures such that a local timer structure for a logical processor is always inserted on and canceled from that logical processor;

executing computer instructions which manage the global timer structures such that a global timer structure for a logical processor is always inserted on that logical processor but may be canceled from that logical processor or from another logical processor;

associating the global timer structures for a logical processor with one of the local timer structures for that logical processor; and the hypervisor providing a global timer to a hosted virtual machine in response to a request from the hosted virtual machine.

17. The configured storage medium of claim 16, wherein the computer instructions do not provide any of the hosted virtual machines with direct access to local timer structures.

18. The configured storage medium of claim 16, wherein the computer data configuring the storage medium comprises a doubly linked list of local timer structures.

19. The configured storage medium of claim 16, wherein the method executes computer instructions which read an earliest expiration time from a local timer structure of a logical processor and then program a hardware interrupt to occur for the logical processor no sooner than the earliest of the expiration times of all of the timers then on the logical processor.

20. The configured storage medium of claim 16, wherein the computer data configuring the storage medium comprises: a linked list of global timer structures; and a link in a local timer structure associating the linked list of global timer structures with the local timer structure.

* * * * *